May 4, 1954     H. F. WATKINS     2,677,402
JUICE EXTRACTING MACHINE
Filed Nov. 8, 1951     8 Sheets-Sheet 4

HAROLD F. WATKINS,
INVENTOR.

BY Lyon & Lyon
ATTORNEYS

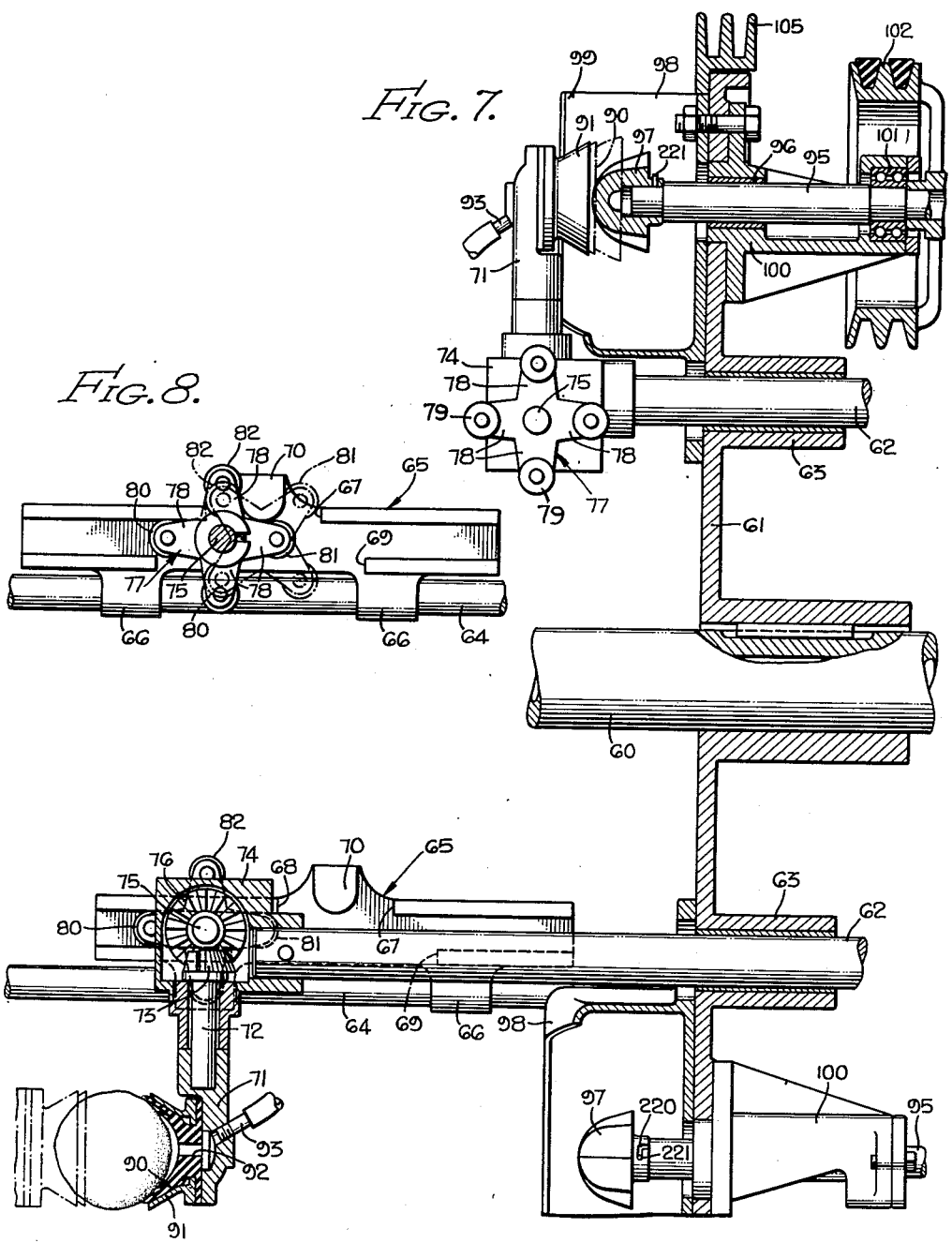

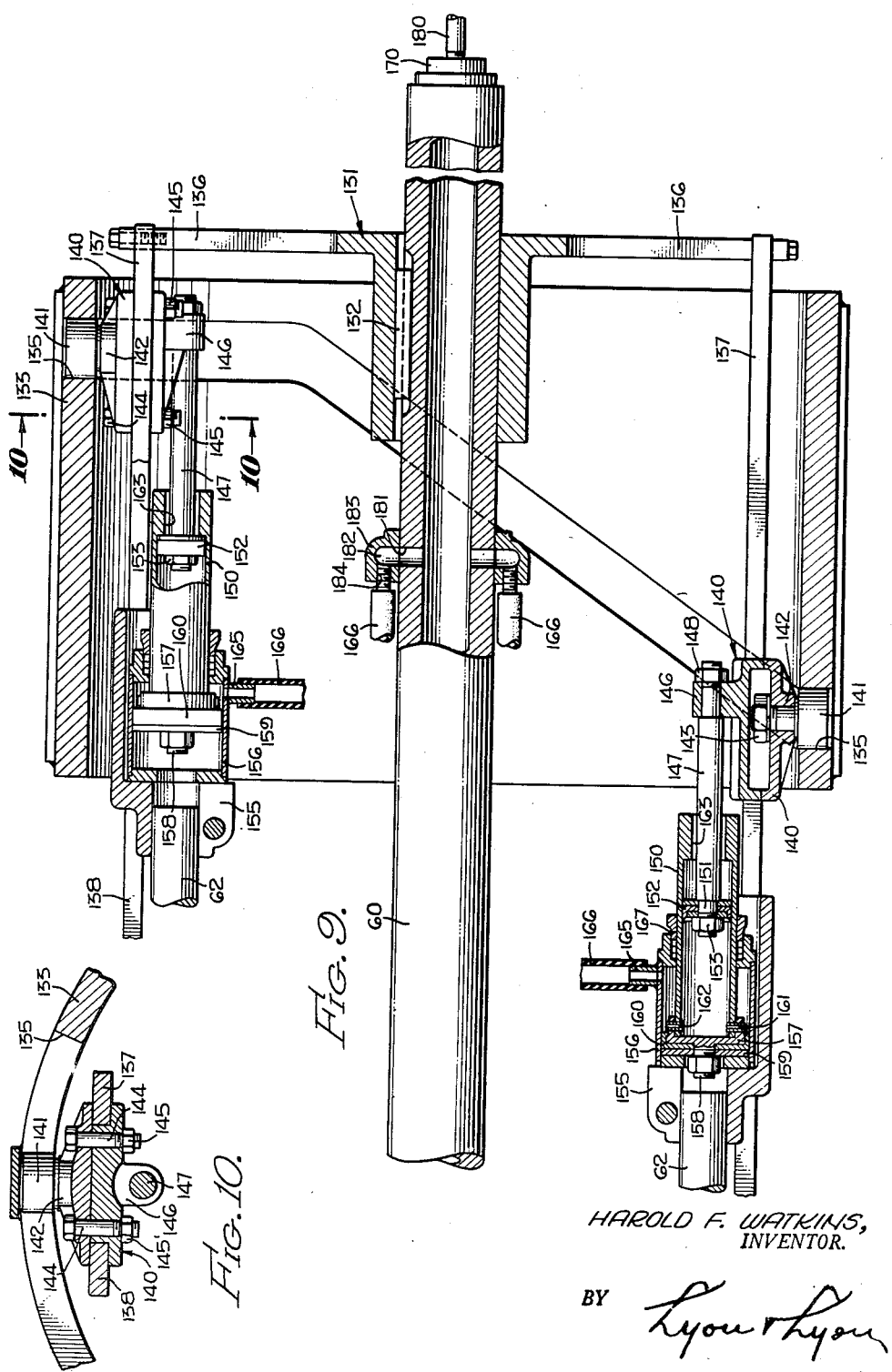

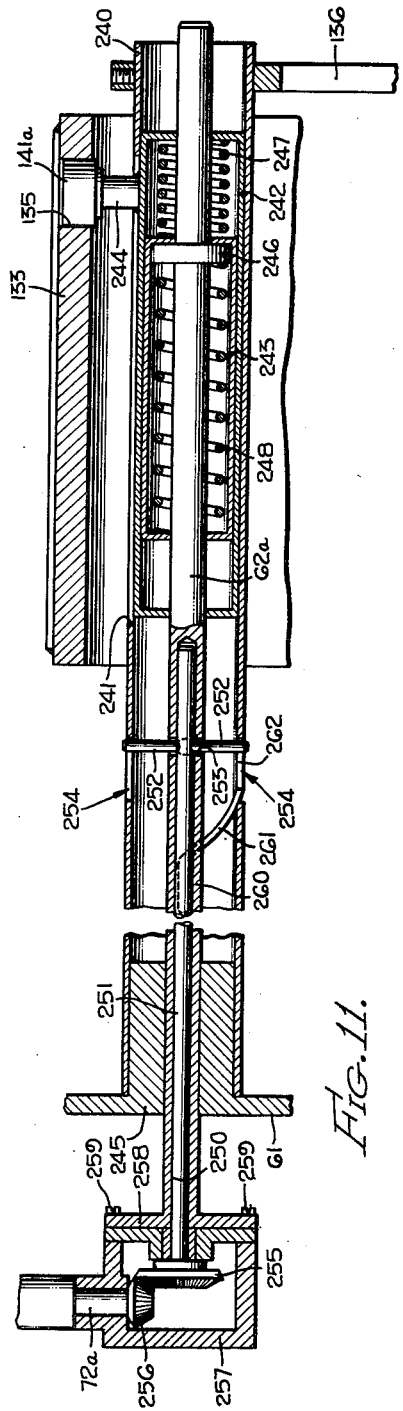

May 4, 1954 H. F. WATKINS 2,677,402
JUICE EXTRACTING MACHINE
Filed Nov. 8, 1951 8 Sheets-Sheet 8
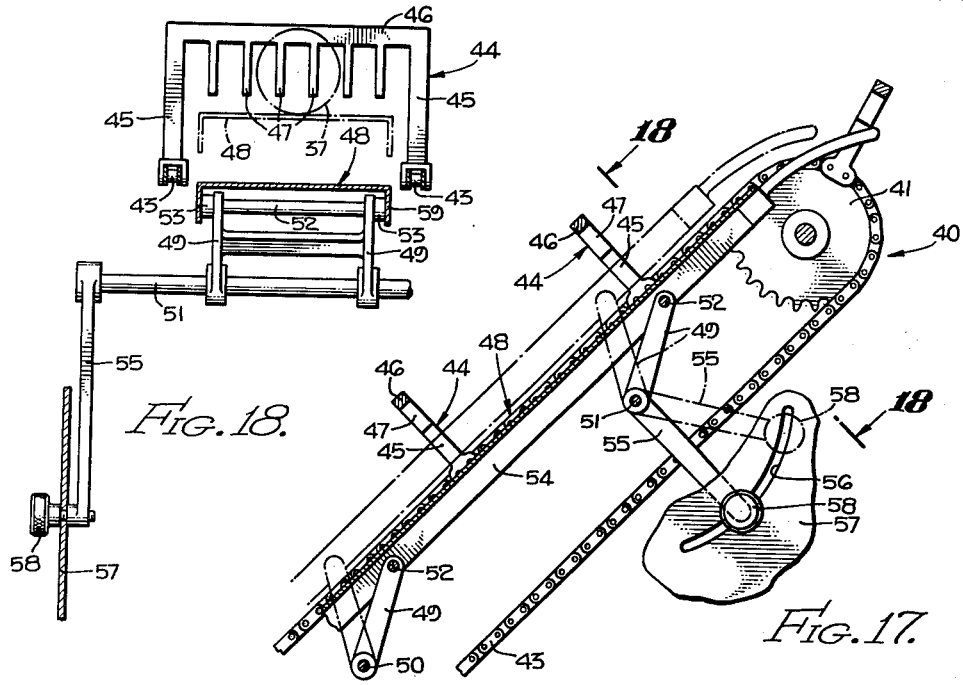
FIG. 17.
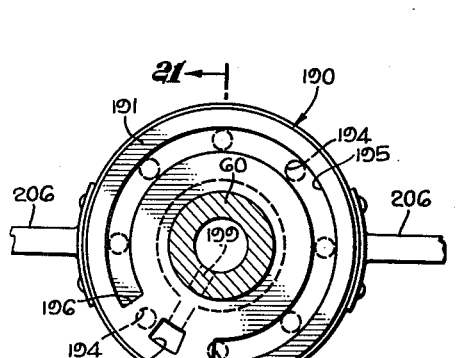
FIG. 18.
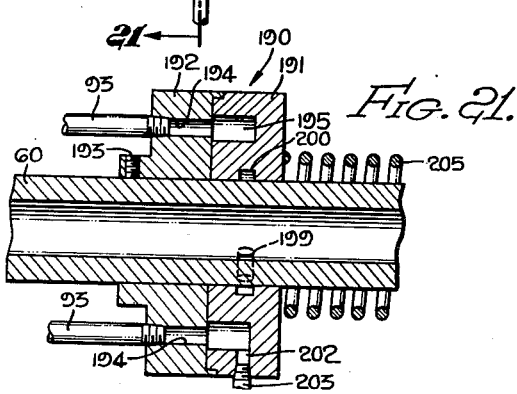
FIG. 20.
FIG. 21.
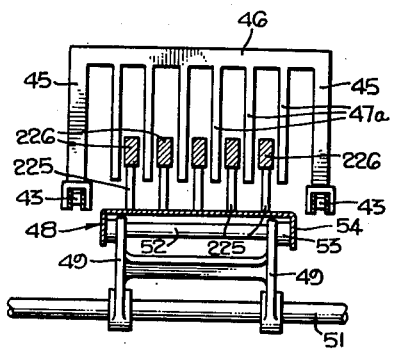
FIG. 19.
HAROLD F. WATKINS,
INVENTOR.
BY Lyon & Lyon
ATTORNEYS Patented May 4, 1954

2,677,402

UNITED STATES PATENT OFFICE 2,677,402

JUICE EXTRACTING MACHINE

Harold F. Watkins, Glendale, Calif.

Application November 8, 1951, Serial No. 255,371

11 Claims. (Cl. 146—3)

This invention relates to a juice extracting machine and more particularly to a machine for use in the large scale commercial production of citrus juices.

The commercial production of citrus fruit juices requires a continuous process in which fruit which has been first graded to size is continuously presented to conveying means to convey the fruit to a station where it is cut in half and from which it is then transported to a juice extractor which is usually in the shape of a burr for extracting the juice. It is then necessary to expel from the machine the fruit halves which have been thus juiced.

Accordingly, it is one object of this invention to provide a machine for continuously conveying, cutting and juicing fruit and continuously expelling the juiced fruit.

It is a further object of this invention to provide such a juice extracting machine in which there is employed a plurality of fruit holding and supporting elements and a like plurality of juice extracting burrs.

It is a feature of this invention that a pair of vertically disposed turrets are provided on which there is provided a plurality of vacuum cups so disposed that during their travel on the turrets, they travel from an initial fruit seizing position to a cutting position and then turned 180° to present the fruit halves to constantly turning burrs for extracting the juice after which the vacuum cups withdraw from the burrs and then return to their initial position, in the process of which returning movement the juiced fruit halves are expelled.

It is a further feature of this invention that said vertically disposed turrets continuously present pairs of oppositely facing vacuum cups to fruit which is continuously presented between said turret plates.

It is a further feature of this invention that there is associated with each of the plurality of burring mechanisms individual means for containing the juice extracted from the fruit for later presentation to a single collecting pan.

It is a further object and feature of this invention to provide a fruit juicing mechanism in which a pair of vertically disposed revolving turrets are provided, which turrets mount the fruit holding and fruit juicing mechanism and control the timing of the movements thereof.

It is a further object of this invention to provide in a mechanism of the type described a resilient support for the fruit contacting vacuum cups which adapts them for use with varying sized fruit.

It is a further object of this invention to provide a fruit juicing machine in which means are provided for presenting the fruit to the fruit holding mechanism with the fruit aligned with its major access directly facing the fruit holding mechanism.

It is a further object of this invention to provide a fruit juicing mechanism of the type described in which the various operations are adjustable to accommodate different sized fruit and to synchronize the various elements of the machine.

These and other objects and advantages will be be apparent from the annexed specification in which:

Figure 4 is a section taken along the line 4—4 of Figure 2.

Figure 7 is a section taken along the line 7—7 of Figure 3.

Figure 8 is a fragmentary view of the track mechanism.

Figure 9 is a section taken along the line 9—9 of Figure 5.

Figure 10 is a section taken along the line 10—10 of Figure 9.

Figure 11 is a sectional view showing a modification of the cup rotation mechanism.

Figure 12 is a diagrammatical view showing one stage of the operation of the cup mechanism with relation to the fruit conveyor and the burring mechanism.

Figure 13 is a view similar to Figure 12 showing a further step.

Figure 14 is a view similar to Figure 13 showing still a further step.

Figures 15 and 16 are views similar to Figures 12, 13 and 14 showing the intermediate and final steps of the mechanism.

Figure 17 is a fragmentary view from the side of the fruit conveyor mechanism which delivers the fruit to the suction cups.

Figure 18 is a view taken along the line 18—18 of Figure 17.

Figure 19 is a view similar to Figure 18 showing a modified form of the conveyor.

Figure 20 is a section taken along the line 20—20 of Figure 1.

Figure 21 is a view taken along the line 21—21 of Figure 20.

Figure 1:
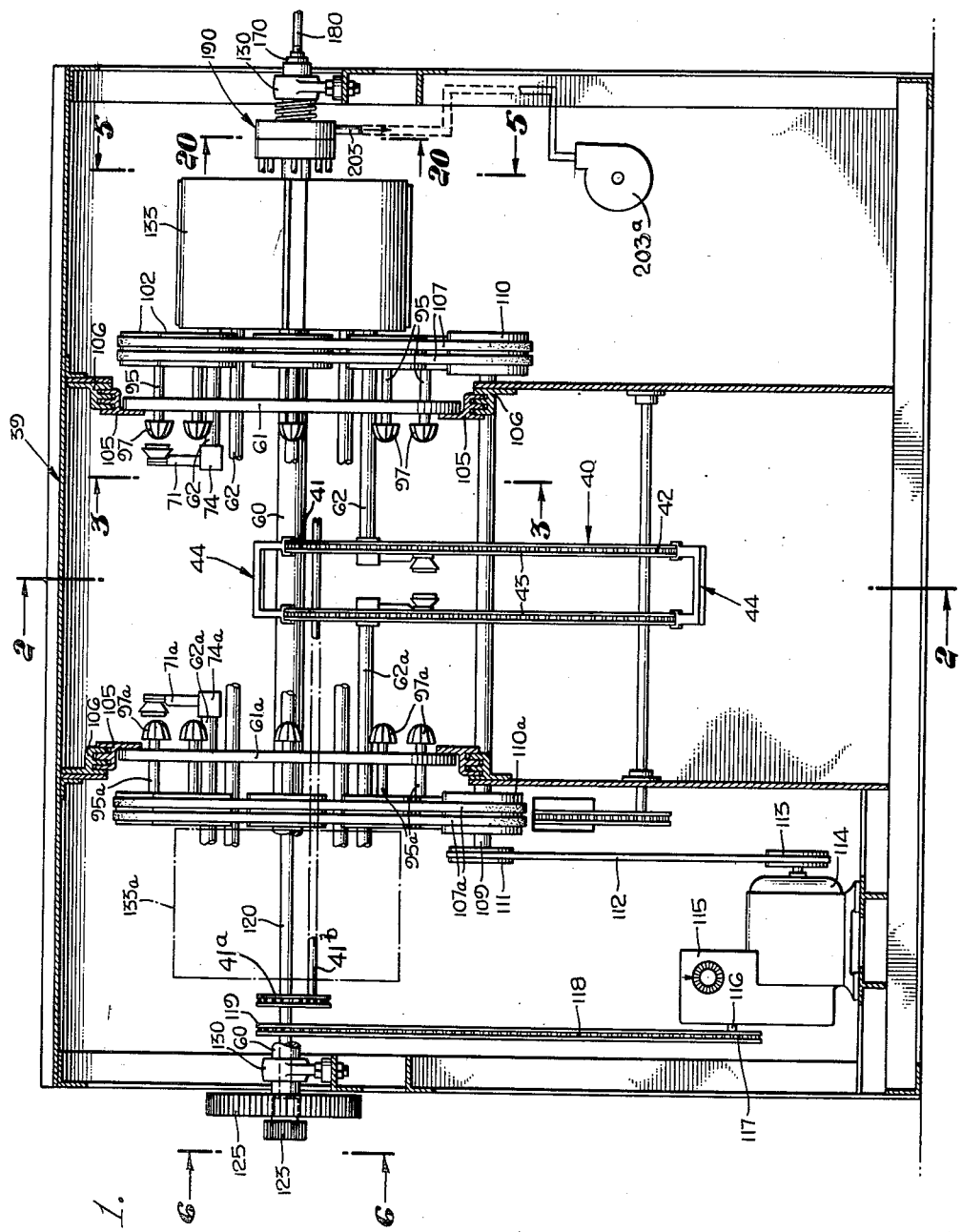
Figure 1 is a vertical section taken substantially midway through the machine shown in Figure 2 with some parts omitted and some parts broken away for clarity of description.
Figure 2:
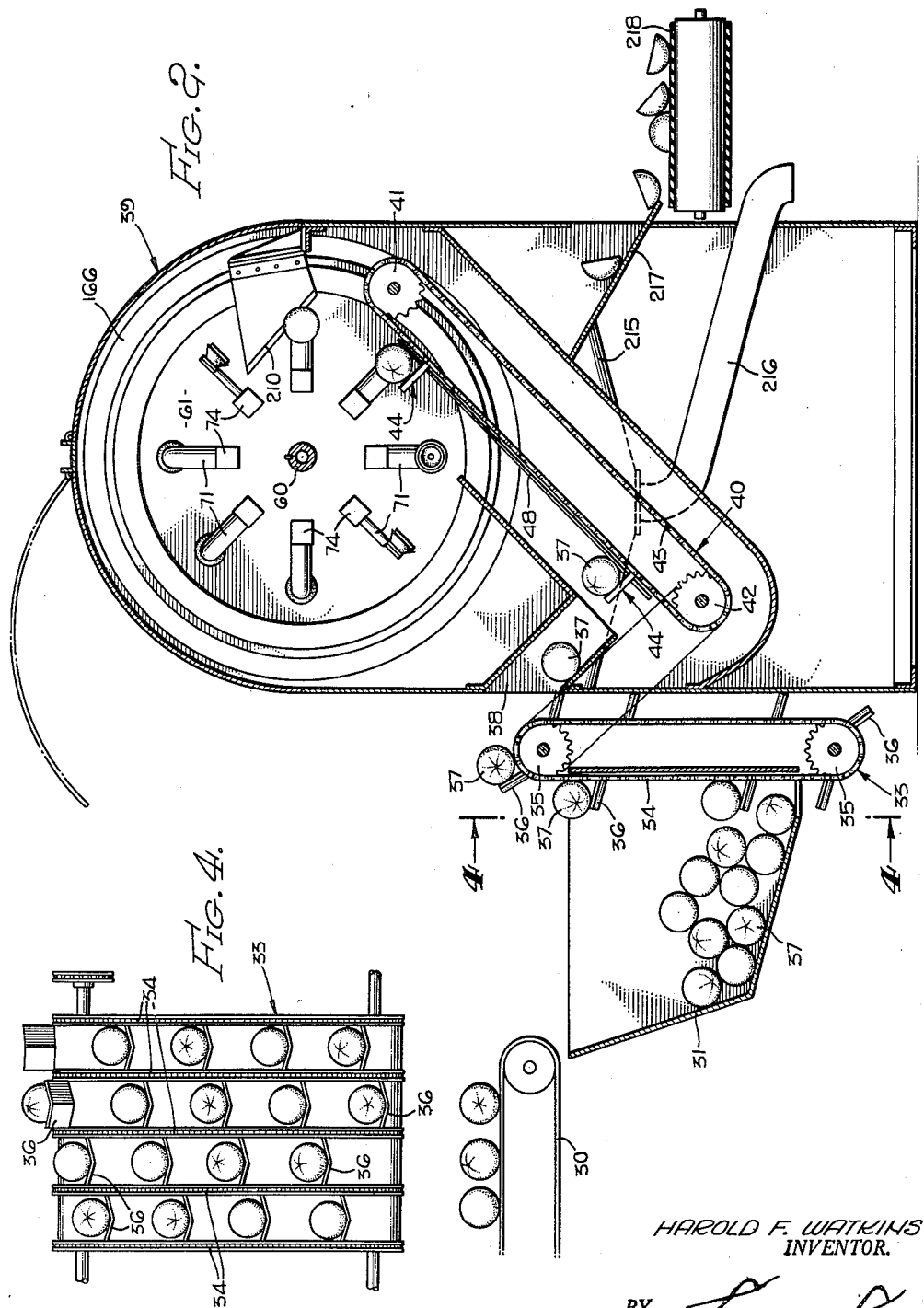
Figure 2 is a section taken along the line 2—2 of Figure 1.

Referring now more particularly to the drawings and particularly to Figure 2, there is shown a conventional belt conveyor 30 adapted to deliver fruit, such as oranges, lemons, grapefruit and the like, to a hopper 31. From the hopper 31, the fruit is conveyed to an elevator 33. The elevator, as shown in Figures 2 and 4, comprises: A plurality of chains 34 associated with a similar plurality of sprockets 35, each pair of chains being provided with staggered buckets 36 adapted to support and convey fruit 37 to the tunnel 38. The juice extractor itself is housed in a housing 39 in which the tunnel 38 leads into the housing towards the bottom of which is the lower end of a second elevator 40. The elevator 40 is shown in Figures 1 and 2 and is more detailed in Figures 17 and 18. The elevator includes an upper sprocket 41 and a lower sprocket 42 over which are passed a pair of chains 43, and is driven through a suitable chain transmission 118 from the motor 114, and transmission 41a operably connecting the shafts 120 and 41b, on which latter shaft is keyed the upper sprocket 41. Connected to the chains 43 are spaced members 44 including a pair of uprights 45, a cross piece 46 and depending fingers 47. Associated with the chains 43 and the spaced members 44 is a supporting plate 48. The supporting plate 48 is adjustably supported upon pivoted arms 49 pivotally supported from shafts 50 and 51 journaled in the housing 39. The arms 49 are themselves connected to a shaft 52 carrying hubs 53 to which are affixed depending flanges 54 of the plate 48. A crank arm 55 is connected to the arms 49 and by any suitable means such as the slot 56 in plate 57 which is secured to housing 39, and nut 58, the crank arm 55 may be suitably adjusted to thereby adjust the position of the plate 48 with respect to the fingers 47. In this means, the elevator 40 may be adjusted to accommodate various sized fruit and to position the centers of the fruit to be suitably contacted by the gripping cups.

Referring now more particularly to Figure 1, it will be seen that there is provided a central shaft 60 on which are mounted a pair of turret plates 61 and 61a. As each of these plates and associated mechanism are mere images of the other, only one will be hereinafter described.

Figure 3:
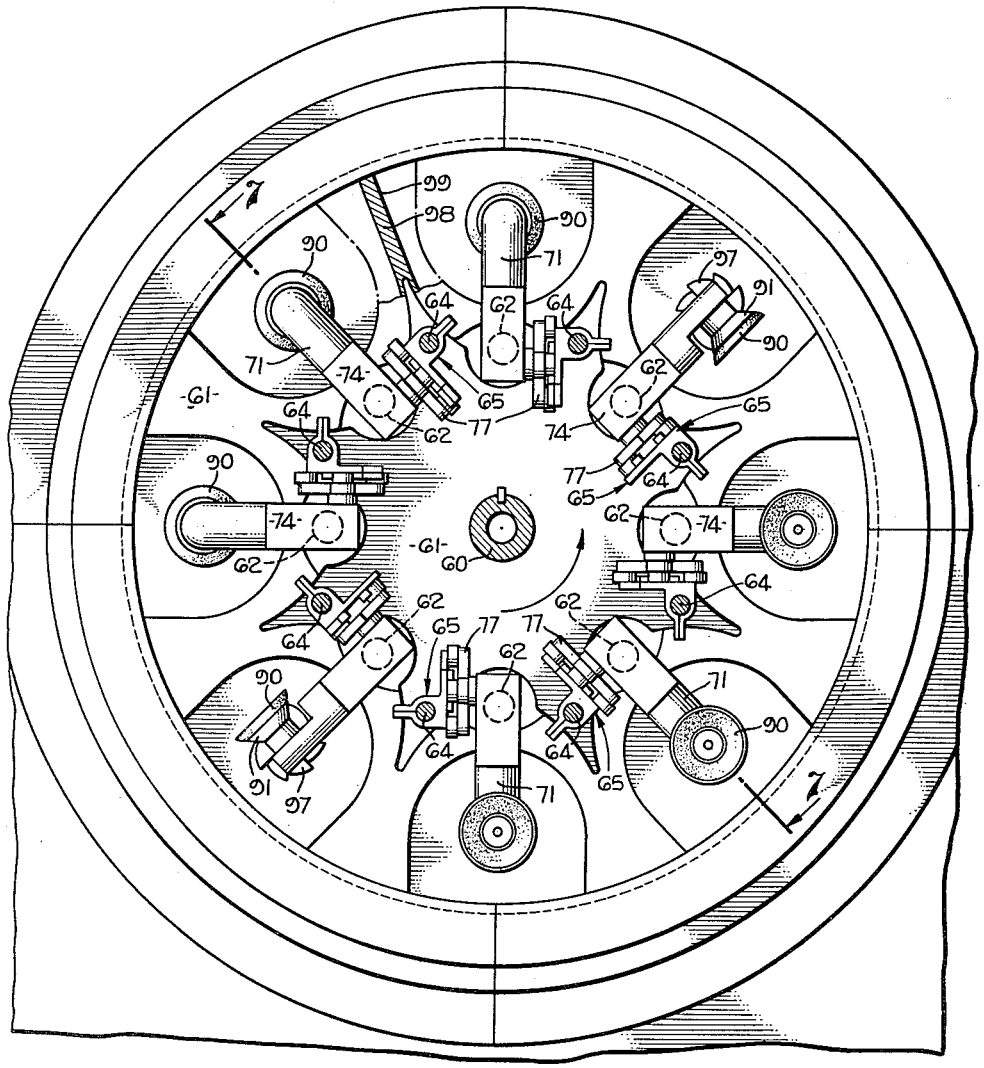
Figure 3 is a view taken along the line 3—3 of Figure 1.

Referring now to Figures 3 and 7, it will be seen that each plate 61 carries a number (eight) of suction cups, and each suction cup has an associated burring mechanism. The suction cups are associated with shafts 62 reciprocally mounted in bushings 63 as hereinafter described. A like plurality of shafts 64 extend fixedly between the plates 61 and 61a, and each of them mounts a track mechanism 65, which track mechanism is affixed to the shaft 64 by ears 66. The track 65 is generally channel shaped in cross section and is provided centrally thereof with openings 67 and 68 on one side and a larger opening 69 on the other side. Between the two openings 67 and 68 is a cam 70.

The cup mechanism is mounted upon a housing 71 which is itself pivotally mounted upon a shaft 72, the inner end of which carries a bevelled gear 73. The shaft 62 carries a housing 74 in which is journaled a shaft 75, on which is keyed a bevelled gear 76 meshing with the gear 73. Also keyed to the shaft 75 is a star wheel 77, the star wheel 77 including four bifurcated arms 78, each of which is provided at its outer end with a pivotally mounted roller 79. The operation of the above described mechanism is as follows: Assuming the mechanism to be as shown in the position indicated in the lower half of Figure 7 wherein the cup has seized a section of fruit to be burred, movement of the shaft 62 to the right will cause the rollers 80 and 81 to travel longitudinally in the channel of the track 65 until such time as the roller 82 contacts the cam 70. Upon such contact of the roller 82 with the cam 70, the star wheel will be pivoted in a counter-clockwise direction as the roller 82 passes under the cam 70, and the star wheel will assume the position shown in phantom in Figure 8. The gears 76 and 73 are so related that a 90° turning of the shaft 75 will cause a 180° turning of the shaft 72 and consequently of the suction cups. Further movement of the shaft 62 to the right will cause further rotation of the star wheel 77 until the star wheel assumes a position to the right of the cam 70 identical to the position shown on the left of the cam 70 in Figure 8. In this position, the suction cup will have been rotated through the full 180° and will be in the position shown in the upper portion of Figure 7 in condition to be presented to the burr. The suction cup is formed of a rubber cup-like portion 90 housed in a shell 91 and provided with a central opening 92 in communication with an air line 93.

The plates 61 and 61a are provided with a like plurality of shafts 95, which shafts are journaled in bearings 96 and carry at their outer end the burrs 97. Around each of the burrs 97 is a housing 98 open at the top as shown at 99 and open at the front to permit access of the suction cups and fruit. A bracket 100 is bolted to the plate 61, and the outer end thereof supports a bearing 101 for a sheave 102, which sheave is fixedly mounted upon the shaft 95.

Each of the plates 61 and 61a is provided in its periphery with a labyrinth seal 105 co-operating with a like seal 106 mounted in the housing 39.

Figure 5:
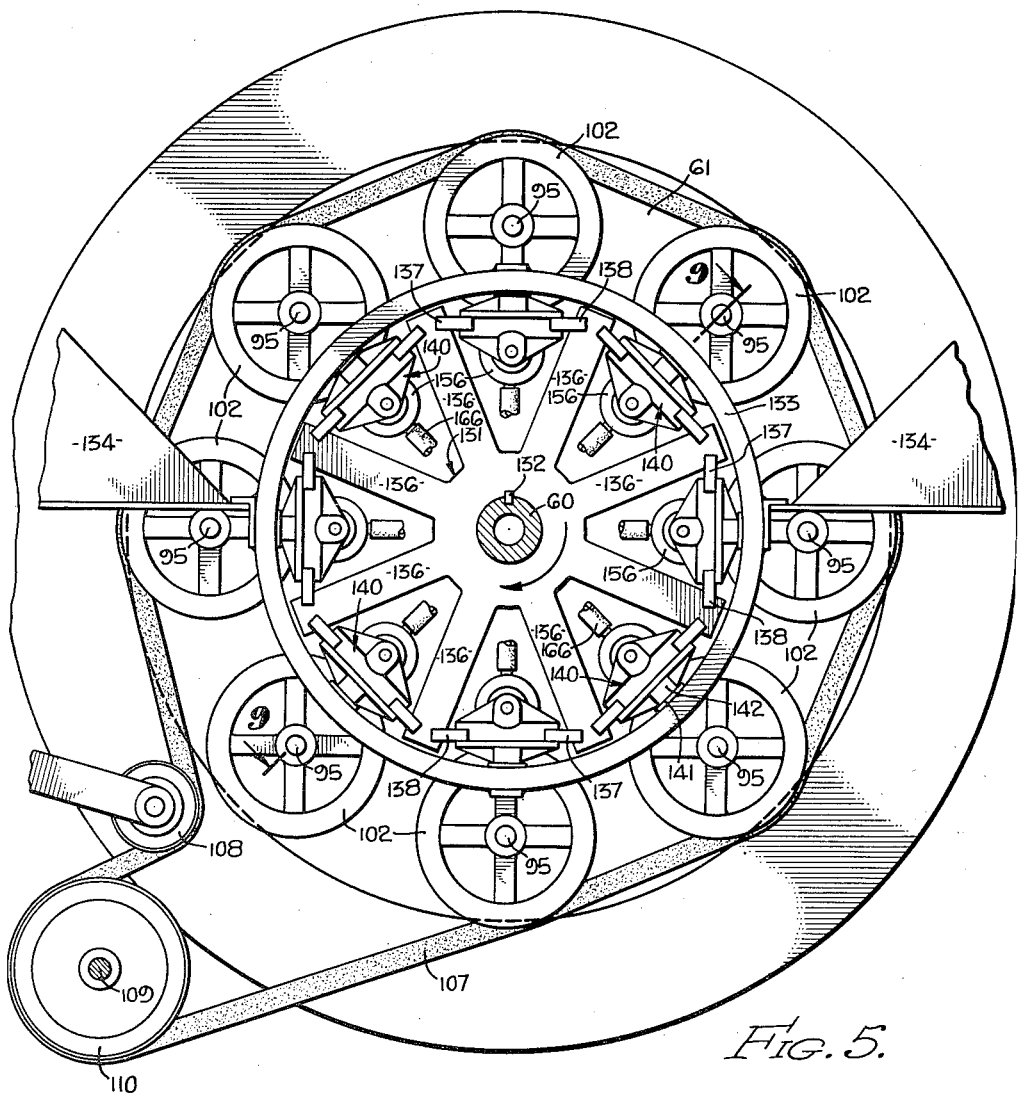
Figure 5 is a view taken along the line 5—5 of Figure 1.
Figure 6:
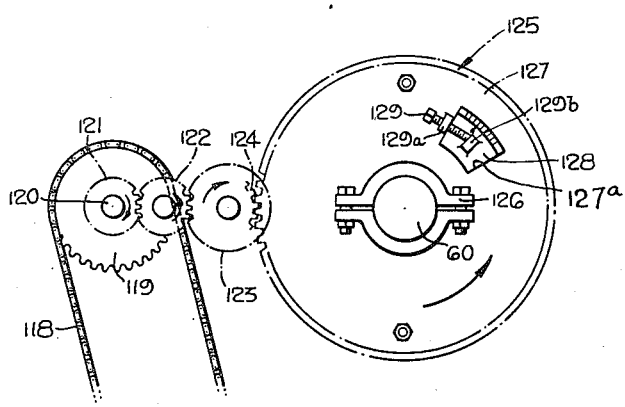
Figure 6 is a view taken along the line 6—6 of Figure 1.

Referring now more particularly to Figure 5, it will be noted that there has been shown eight of the burr mounting shafts 95, each of which carries an associated sheave 102. A belt 107 passes over an idler 108 and also over a sheave 110 mounted on a drive shaft 109. The drive shaft 109 carries a sheave 111 and a belt 112 passes from the sheave 111 to the sheave 113 on the shaft of the electromotor 114. It will be obvious from Figure 5 that the sheaves 102 are generally in contact with the belt 107 but as the plate 61 is rotated certain of the sheaves will pass from contact with the belt 107 during a portion of their travel but will return to contact with the belt thereafter. The shaft 60 and consequently the plates 61 and 61a are driven as follows: A gear box 115 is associated with a motor 114 and provided with a take-off 116 mounting a sprocket 117, engaging a chain 118, which chain 118 engages a sprocket 119 mounted on a shaft 120. The shaft 120 carries a gear 121 (see Figure 6), which gear 121 engages an idler 122, which idler 122 engages a second idler 123, which idler 123 is provided with a smaller idler 124 meshing with the large gear 125. The large gear 125 is adjustably affixed to the shaft 60 by a split collar 126 and a pair of plates 127 having an aperture 127a and 128. The plate 128 is keyed to the shaft 60 and the plate 127 is affixed to one portion of the split collar 126 and adjustment may be made between the two plates by means of thumb screw 129 and lugs 129a and 129b, the lug 129b extending through the aperture 127a. By the means just described, the movement of the plates 61 and 61a can be synchronized with the movement of the elevator 40 so that the cups 90 are properly synchronized with the arrival of fruit. The shaft 60 is supported at either end by bearings 130 and mounts intermediate its ends at each side a spider 131 which is keyed thereto as at 132. A barrel 133 is mounted within the housing 39 by brackets 134 and the barrel is provided with a cam groove 135. Each arm 136 of the spider engages and supports one end of a pair of tracks 137 and 138. The other end of the tracks 137 and 138 is affixed to the plate 61 and the tracks are thus mounted for rotation with the plates 61 and 61a. Each pair of tracks 137 and 138 slidably mounts a roller support 140 having a roller 141 pivotally mounted in a boss 142 and retained therein by a nut 143. The housing 140 is split as shown in Figure 10 and the two halves thereof are clamped upon opposite sides of the tracks 137 and 138 by means of bolts 144 and nuts 145. The housing 140 is provided with a boss 146 which is journaled to receive one end of the shaft 147 retained therein by a nut 148 on the threaded end of the shaft 147. The shaft 147 is received within a cylinder 150 and on the reduced end 151 thereof is a piston 152 retained thereon by a nut 153. Each shaft 62 fixedly mounts a support 155 to which is attached a cylinder 156. The cylinder 150 at its inner end is provided with a cap 157 which has a stud 158 which secures thereon a plate 159 which retains a leather cup 160 for sliding engagement within the interior of the cylinder 156. The cylinder 150 is provided with a pair of airbleed passages 161 and 162 at one end and is open at the other end as at 163. The cylinder 156 is provided with a fitting 165 receiving an airline 166 to communicate pressure to the interior cylinder 156. The cylinder 150 is provided with a packing gland 167.

From the foregoing description, it will be apparent that as the shaft 60 is revolved it will carry with it the spider 131 and consequently each of the tracks 137 and 138 and associated mechanism. This results in a travel in the cam groove 135 of each of the rollers 141 and thus a reciprocation of the shaft 147. Reciprocation of the shaft 147 causes a reciprocation of the mechanism associated therewith with, however, an intervening dash-pot effect.

On travel of the cam 141 to the left as shown in Figure 9, the shaft 147 and consequently the piston 152 will be forced to the left. Air under pressure, within the cylinder 150 will prevent any substantial travel of the piston 152 within the cylinder 150 until the cup 90 contacts a fruit to be juiced. If this is a small fruit, such as a lemon, substantially no movement of the piston 152 within the cylinder 150 would take place. However, if a large orange is contacted, the difference in size would be compensated by a leftward movement of piston 152 within the cylinder 150.

Likewise upon presentation of the halved fruit to the burr 97, upon complete movement of the roller 141 to the right as shown in Figure 9, the condition shown in the upper half of the figure will prevail. If this is the case, the piston 152 will have moved as far as it can to the right within the cylinder 150 and compensation for varying sized fruit will be made by movement of the piston 160 within the cylinder 156 against the air pressure supplied from the air line 166.

The shaft 60 is hollow and at one end thereof is provided with a fitting 170 which connects an air line 180 to the interior of the shaft 60. Air under pressure is thus applied to the shaft 60 and the shaft is provided with a plurality of bores 181 communicating with a passage 182 and a collar 183, which collar is tapped as at 184 to receive the threaded end 185 of a fitting for air lines 166 communicating air under pressure to the interior of the cylinder 156.

Referring now more particularly to Figures 1, 20 and 21, it will be seen that the shaft 60 carries a selector valve at 190. The selector valve 190 comprises a pair of valve plates 191 and 192. The valve plate 192 is keyed to the shaft 60 as by means of the set screw 193 and is provided with a plurality of bores (eight in number) 194, each of which is tapped to receive one end of an associated air line 93. The plate 191 is provided with an annular groove 195, which annular groove is not continuous but is interrupted as at 196 and 197 between which there is a segment 198 of groove. The shaft 60 is provided with a bore 199 through the wall thereof and the plate 191 is provided with an annular groove 200 on the inner wall thereof, which annular groove 200 is in communication with a bore 201 communicating with the segment 198, thus air under pressure from the interior of the shaft 60 is at all times communicated to the segment 198. The plate 191 is provided with a bore 202 which is tapped to receive the end of a conduit 203 which leads to a source of vacuum, such as the pump 203a and the bore 202 communicates with the groove 195 and thus the groove 195 is placed under vacuum. The plate 191 is slidable on the shaft 60 and is biased toward the plate 192 by means of a coil spring 205, one end of which bears upon the plate 191 and the other end of which bears against the bearing 130. The plate 191 is, however, fixed against rotation by means of brackets 206.

From the foregoing description, it will be apparent that as the shaft 60 rotates the air lines 93 will be communicated through the bores 194 to the groove 195 and hence to a source of vacuum during the major portion of rotation. As the bores 194 register with the portions 196 or 197, this source of vacuum is shut off and when the bores 194 register with the segment 198 air under pressure is communicated to the air lines 93. From the foregoing, it will be seen that the vacuum cups 90 are generally provided with a source of vacuum and thus they are able to pick up and retain the fruit and present the same to the burrs 97. However, when the juice has been extracted from the fruit, and the vacuum cups are rotated to position to pick up another fruit, air under pressure will be supplied to the vacuum cups, thus positively ejecting the used fruit half.

Referring now more particularly to Figures 12 through 16, the cycle of operation is as follows: Adjustment between the plates 128 and 127 having been properly made, the chain 43 and spaced members 44 will present fruit to be burred to the station to be picked up by the vacuum cups at the precise moment that the vacuum cups are in position to contact the fruit. The supporting plate 48 having been properly adjusted to present fruit of the size being run so that it centers at approximately the centers of the vacuum cups 90, the vacuum cups from either side of the machine approach the fruit as shown in Figure 12 and in this cycle the air lines 93 are in communication with the groove 195 and vacuum is applied as the fruit is seized. Rotation of the shaft 60 presents the fruit to a stationary knife 210 mounted on the housing 39 above the sprocket 41 and coplanar with a plane perpendicular to and through the longitudinal center of the elevator 40 (see Figure 1) which cuts the fruit into two halves. The cups 90 are not rotating during travel from the pickup station as shown in Figure 12 past the knife 210 as the rollers 80 and 81 of star wheel 77 are in the channel of track 65 and roller 82 has not yet contacted cam 70. From this stage the shafts 62 are retreated, the shafts 72 are turning, thus moving the cups as shown in Figures 13 and 14 to position to present the fruit to the burrs 97 as shown in Figure 15. With the burring operation completed the shafts 62 are forced under the action of the cam groove 135 outwardly again and in the course of their travel to position to again contact a subsequent fruit, the air lines 93 are supplied with air under pressure from the segment 199 and the interior of the shaft 60 thus positively ejecting the burred fruit half. The juice thus extracted is retained in the housings 98 until the opening 99 thereof approaches an inverted position at which time the juice is dumped into the pan 215 where it is collected and passed to the spout 216. Ejected fruit halves fall upon plate 217 from which they are dumped to a belt 218 for disposal.

The burrs 97 are connected to the shafts 95 by means of a J-slot 220 and pin 221 and hence are readily removable for exchange or cleaning.

Referring now more particularly to Figure 19, there is shown an alternate construction of the elevator 40. In this construction, the chains 43, uprights 45, cross piece 46 and depending fingers 47a are generally similar to those shown in the previous embodiment with the exception that the fingers are increased in length. The plate 48 is, however, provided with a plurality of upstanding members 225 which support spaced rods 226 between which the fingers 47a may depend. This arrangement insures that fruit of whatever size is adequately supported by the rods 226 and is securely contacted by the fingers 47a.

Referring now more particularly to Figure 11, there is shown an alternate modification of the cup rotation mechanism.

The spider arms 136 are in this case attached to a cylinder 240. The cylinder 240 is provided with a longitudinal opening 241 and within the cylinder is mounted a hollow cylinder or piston 242, on one wall of which is mounted a stub shaft 244 which pivotally mounts the roller 141a in the groove 135 of barrel 133. The cylinder 242 is closed at both ends and itself contains a second piston or cylinder 243. A shaft 62a extends through a bushing 245 mounted in one end of the cylinder 240 through the end wall of the cylinder 242 and likewise through the end wall of the cylinder 243 and is provided within the cylinder 243 with a collar 246. A coil spring 247 is provided within the cylinder 242 with one end bearing on the end wall thereof and the other end bearing on the end wall of the cylinder 243. A second coil spring 248 is provided within the cylinder 243 with one end bearing upon the collar 246 and the other end bearing upon the left end wall of the cylinder 243. The shaft 62a extends through the right end wall of the cylinder 243 and through the right end wall of the cylinder 242.

The shaft 62a is provided with a central bore 250 in which is disposed a rod 251. The rod 251 mounts a pair of pins 252, which pins extend respectively radially thereof through an opening 253 in the wall of the shaft 62a, and the outer ends of the pins 252 lie in a cam groove 254 in the wall of the cylinder 240. The inner end of the rod 251 carries a bevelled gear 255 meshing with the bevelled gear 256 within the gear box 257, which gear box 257 is carried upon the end of the shaft 62a by means of a mounting plate 258 affixed thereto by studs 259. The bevelled gear 256 is mounted upon one end of the shaft 72a which is in all other respects similar to the shaft 72 hereinabove described.

The gears 255 and 256 are so related that a 90° turning of the gear 255 causes a 180° turning of the gear 256. The cam groove 254 is provided with a straight portion 260, a curved portion 261 and a second straight portion 262. It will be apparent from the aforesaid description that movement of the roller 141a forward and to the left in the cam groove 135 on turning of the spider 136 will cause the cylinder 242 to be moved to the left. Movement of this cylinder to the left, as shown in Figure 11, will cause a similar movement of the cylinder 243 and consequently of the collar 246 and the shaft 62a. Such movement results in a twisting of the rod 251 within the shaft 62a as the pins 252 in the cam grooves 254 and thus a turning of the gears 255 and 256. It will be noted, however, that at the start of the movement to the left of the rollers 141a there is no turning of the rod 250 due to the straight portion 262 of the cam groove 254. Likewise, at the start of return of the mechanism to the right, as shown in Figure 11, there will be no turning of the rod 251 due to the straight portion 260.

Furthermore, when the mechanism has travelled completely to the left, as shown in Figure 11, and in the event there is a large size fruit to be contacted, the rod 62a is free to move to the right against the bias of the spring 247. Upon movement of the roller 141a completely to the right and the concurrent drawing of the cups containing halved fruit against the burrs of the rod 62a will be free to move to the left to compensate for varying sized fruit against the bias of the spring 248.

Referring now more particularly to Figure 4, it will be noted that there are four lines of buckets 36 in staggered relation. However, the elevator 40 is provided with only one line as there is only one pair of turret plates. The result is that the elevator 33 needs to operate at only one-fourth of the speed of the elevator 40 which is an important consideration when fruit is being lifted.

Referring to Figures 2, 17 and 18, it will be apparent that as the fruit is moved upwardly on the elevator 40, it is rolled upon the supporting plate 48 and thus when it arrives in the station to be gripped by the vacuum cups 90, the fruit, especially if it be of an oval shape such as a lemon, will be in the position shown in Figure 12 in which the ends of the lemon are facing the approaching cups, due to the fact that the fruit will naturally roll on its small diameter.

From the foregoing description, it will also be apparent that the fruit juicing mechanism above described provides a continuous cycle continuously picking up, positioning, halving, burring and ejecting the fruit wherein a plurality of burring and a like plurality of fruit-holding mechanisms are constantly in action.

While there has been described what is at present considered a preferred embodiment of the present invention, it will be appreciated by those skilled in the art that various changes and modifications can be made therein without departing from the essence of the invention and it is intended to cover herein all such changes and modifications as come within the true spirit and scope of the appended claims.

What is claimed is:

1. In a fruit juicing machine: a pair of turret plates mounted for simultaneous rotation on a common axis; means for rotating said turret plates; a plurality of pivotally mounted burrs disposed circumferentially of each of said turret plates; said burrs facing inwardly between said turret plates; means for pivoting said burrs; a corresponding plurality of vacuum cup supporting elements mounted on each of said turret plates, each in equally spaced relation to a corresponding burr; a vacuum cup pivotally mounted on each of said supporting elements; means for moving said supporting elements towards and away from a corresponding directly opposite supporting element on the opposite turret plate during rotation of said turret plates; means for pivoting said vacuum cups 180° from a position directly facing a corresponding cup on the opposite turret plate to a position directly facing their corresponding burrs; a fruit conveyor for delivering fruit to be juiced in between said turret plates in position to be gripped by a pair of said directly facing vacuum cups; a knife mounted midway between said turret plates to halve fruit gripped between a pair of said directly facing vacuum cups; and means applying air suction to said vacuum cups.

2. In a fruit juicing machine: a pair of turret plates mounted for simultaneous rotation on a common axis; means for rotating said turret plates; a plurality of pivotally mounted burrs disposed circumferentially of each of said turret plates; said burrs facing inwardly between said turret plates; means for pivoting said burrs; a corresponding plurality of vacuum cup supporting elements mounted on each of said turret plates, each in equally spaced relation to a corresponding burr; a vacuum cup pivotally mounted on each of said supporting elements; means for moving said supporting elements towards and away from a corresponding directly opposite supporting element on the opposite turret plate during rotation of said turret plates; means for pivoting said vacuum cups 180° from a position directly facing a corresponding cup on the opposite turret plate to a position directly facing their corresponding burrs; a fruit conveyor for delivering fruit to be juiced in between said turret plates in position to be gripped by a pair of said directly facing vacuum cups; a knife mounted midway between said turret plates to halve fruit gripped between a pair of said directly facing vacuum cups; and means applying air suction to said vacuum cups, each of said vacuum cups being mounted to remain in position directly facing a directly opposite vacuum cup and in fruit engaging position during movement of said turret plates to carry fruit engaged by such pair of said cups over said knife prior to beginning said 180° turning.

3. In a fruit juicing machine: a pair of turret plates mounted for simultaneous rotation on a common axis; means for rotating said turret plates; a plurality of pivotally mounted burrs disposed circumferentially of each of said turret plates; said burrs facing inwardly between said turret plates; means for pivoting said burrs; a corresponding plurality of vacuum cup supporting elements mounted on each of said turret plates, each in equally spaced relation to a corresponding burr; a vacuum cup pivotally mounted on each of said supporting elements; means for moving said supporting elements towards and away from a corresponding directly opposite supporting element on the opposite turret plate during rotation of said turret plates; means for pivoting said vacuum cups 180° from a position directly facing a corresponding cup on the opposite turret plate to a position directly facing their corresponding burrs; a fruit conveyor for delivering fruit to be juiced in between said turret plates in position to be gripped by a pair of said directly facing vacuum cups; a knife mounted midway between said turret plates to halve fruit gripped between a pair of said directly facing vacuum cups; and means applying air suction to said vacuum cups; said vacuum cups being mounted to pivot back to said directly facing position after burring is completed; and means to interrupt said air suction and to apply air under pressure to said cups during said turning movement of said cups back towards said directly facing position.

4. In a fruit juicing machine: a pair of turret plates mounted for simultaneous rotation on a common axis; means for rotating said turret plates; a plurality of pivotally mounted burrs disposed circumferentially of each of said turret plates; said burrs facing inwardly between said turret plates; means for pivoting said burrs; a corresponding plurality of vacuum cup supporting elements mounted on each of said turret plates, each in equally spaced relation to a corresponding burr; a vacuum cup pivotally mounted on each of said supporting elements; means for moving said supporting elements towards and away from a corresponding directly opposite supporting element on the opposite turret plate during rotation of said turret plates; means for pivoting said vacuum cups 180° from a position directly facing a corresponding cup on the opposite turret plate to a position directly facing their corresponding burrs; a fruit conveyor for delivering fruit to be juiced in between said turret plates in position to be gripped by a pair of said directly facing vacuum cups; a knife mounted midway between said turret plates to halve fruit gripped between a pair of said directly facing vacuum cups; and means applying air suction to said vacuum cups; said supporting elements having resilient means to permit engagement of said vacuum cups with various sized fruit without injury thereto.

5. In a fruit juicing machine: a pair of turret plates mounted for simultaneous rotation on a common axis; means for rotating said turret plates; a plurality of pivotally mounted burrs disposed circumferentially of each of said turret plates; said burrs facing inwardly between said turret plates; means for pivoting said burrs; a corresponding plurality of vacuum cup supporting elements mounted on each of said turret plates, each in equally spaced relation to a corresponding burr; a vacuum cup pivotally mounted on each of said supporting elements; means for moving said supporting elements towards and away from a corresponding directly opposite supporting element on the opposite turret plate during rotation of said turret plate; means for pivoting said vacuum cups 180° from a position directly facing a corresponding cup on the opposite turret plate to a position directly facing their corresponding burrs; a fruit conveyor for delivering fruit to be juiced in between said turret plates in position to be gripped by a pair of said directly facing vacuum cups; a knife mounted midway between said turret plates to halve fruit gripped between a pair of said directly facing vacuum cups; and means applying air suction to said vacuum cups; a plurality of cups each disposed partly around and below one of said burrs during burring action and adapted to collect juice from fruit being burred and transport said juice to a collecting pan.

6. In a fruit juicing machine: a pair of turret plates mounted for simultaneous rotation on a common axis; means for rotating said turret plates; a plurality of pivotally mounted burrs disposed circumferentially of each of said turret plates; said burrs facing inwardly between said turret plates; means for pivoting said burrs; a corresponding plurality of vacuum cup supporting elements mounted on each of said turret plates, each in equally spaced relation to a corresponding burr; a vacuum cup pivotally mounted on each of said supporting elements; means for moving said supporting elements towards and away from a corresponding directly opposite supporting element on the opposite turret plate during rotation of said turret plates; means for pivoting said vacuum cups 180° from a position directly facing a corresponding cup on the opposite turret plate to a position directly facing their corresponding burrs; a fruit conveyor for delivering fruit to be juiced in between said turret plates in position to be gripped by a pair of said directly facing vacuum cups; a knife mounted midway between said turret plates to halve fruit gripped between a pair of said directly facing vacuum cups; and means applying air suction to said vacuum cups; means for adjusting said turret plates with respect to said fruit conveyor to synchronize said cups with respect to said fruit conveyor.

7. A device as set forth in claim 1 in which each of said supporting elements comprise a bracket, a rod supporting said bracket, said rod being mounted for movement longitudinally of said rod in a plane perpendicular to its associated turret plate; and a cam follower on each rod; a cam engaging each of said cam followers and adapted to reciprocate said rods.

8. In a fruit juicing machine: a pair of turret plates mounted for simultaneous rotation on a common axis; means for rotating said turret plates; a plurality of pivotal mounted burrs disposed circumferentially of each of said turret plates; said burrs facing inwardly between said turret plates; means for pivoting said burrs; a corresponding plurality of vacuum cup supporting elements mounted on each of said turret plates, each in equally spaced relation to a corresponding burr; a vacuum cup pivotally mounted on each of said supporting elements; means for moving said supporting elements towards and away from a corresponding directly opposite supporting element on the opposite turret plate during rotation of said turret plates; means for pivoting said vacuum cups 180° from a position directly facing a corresponding cup on the opposite turret plate to a position directly facing their corresponding burrs; a fruit conveyor for delivering gruit to be juiced in between said turret plates in position to be gripped by a pair of said directly facing vacuum cups; a knife mounted midway between said turret plates to halve fruit gripped between a pair of said directly facing vacuum cups; and means applying air suction to said vacuum cups; said fruit conveyor comprising an endless chain; a fruit supporting member adjacent said chain and means for adjusting said supporting plate vertically with respect to said turret plates.

9. A fruit juicing machine comprising a pair of spaced turret plates mounted for simultaneous rotation on a common axis and in parallel vertical planes; means for rotating said turret plates; a plurality of vacuum cups on each plate providing means to seize fruit presented between said plates from each side, traverse said fruit over a halving knife and then present the fruit halves to juicing burrs; an elevator for presenting fruit between said plates, said elevator comprising a supporting plate and means travelling adjacent said supporting plate and operative to roll fruit along said supporting plate whereby said fruit aligns upon said supporting plate with its major axis transversely extending across said supporting plate.

10. A fruit juicing machine comprising a pair of spaced turret plates mounted for simultaneous rotation on a common axis and in parallel vertical planes; means for rotating said turret plates; a plurality of vacuum cups on each plate providing means to seize fruit presented between said plates from each side, traverse said fruit over a halving knife and then present the fruit halves to juicing burrs; an elevator for presenting fruit between said plates, said elevator comprising a supporting plate and means travelling adjacent said supporting plate and operative to roll fruit along said supporting plate whereby said fruit aligns upon said supporting plate with its major axis transversely extending across said supporting plate, and means for adjusting said supporting plate vertically with respect to said turret plates.

11. In a fruit juicing machine: a pair of turret plates mounted for simultaneous rotation on a common axis; means for rotating said turret plates; a plurality of pivotally mounted burrs disposed circumferentially of each of said turret plates; said burrs facing inwardly between said turret plates; means for pivoting said burrs; a corresponding plurality of vacuum cup supporting elements mounted on each of said turret plates, each in equally spaced relation to a corresponding burr; a vacuum cup pivotally mounted on each of said supporting elements; means for moving said supporting elements towards and away from a corresponding directly opposite supporting element on the opposite turret plate during rotation of said turret plates; means for pivoting said vacuum cups 180° from a position directly facing a corresponding cup on the opposite turret plate to a position directly facing their corresponding burrs; a fruit conveyor for delivering fruit to be juiced in between said turret plates in position to be gripped by a pair of said directly facing vacuum cups; a knife mounted midway between said turret plates to halve fruit gripped between a pair of said directly facing vacuum cups; and means applying air suction to said vacuum cups; and means for driving said turret plates and said fruit conveyor whereby each of said vacuum cups continuously follows a cycle which comprises, approaching an oppositely mounted cup to seize a fruit from said fruit conveyor, carrying said fruit over said knife to halve said fruit, turning 180° to present the fruit half to a burr, holding said fruit half against said burr for juicing, withdrawing the burred fruit, turning back through 180° to seize a subsequent fruit and ejecting said burred fruit during said backward turning.

References Cited in the file of this patent

UNITED STATES PATENTS

| Number | Name | Date |
|---|---|---|
| 2,181,442 | Watkins | Nov. 28, 1939 |

FOREIGN PATENTS

| Number | Country | Date |
|---|---|---|
| 117,683 | Australia | Nov. 11, 1943 |